United States Patent [19]
Stockburger et al.

[11] Patent Number: 4,533,237
[45] Date of Patent: Aug. 6, 1985

[54] METHOD AND DEVICE FOR REGISTERING THE USE OF COPYING MACHINES

[76] Inventors: Hermann Stockburger, Kirnachweg 7, D-7742 St. Georgen; Hans-George Winderlich, Niedere Str. 36, D-7730 Villingen; Siegfried Bauer, Kussenhofstr. 16, D-7743 Furtwangen; Zeljko H. Adamovic, Hochstr. 6, D-7730 Villingen/Schwenningen, all of Fed. Rep. of Germany

[21] Appl. No.: 628,802

[22] Filed: Jul. 9, 1984

Related U.S. Application Data

[63] Continuation of Ser. No. 553,421, Nov. 18, 1983, abandoned, which is a continuation of Ser. No. 302,096, Sep. 14, 1981, abandoned.

[30] Foreign Application Priority Data

| Nov. 7, 1980 | [DE] | Fed. Rep. of Germany | 3042132 |
| Mar. 23, 1981 | [DE] | Fed. Rep. of Germany | 3111354 |
| May 18, 1981 | [DE] | Fed. Rep. of Germany | 3119756 |
| Jun. 24, 1981 | [DE] | Fed. Rep. of Germany | 3124836 |

[51] Int. Cl.³ .............................................. G03B 27/52
[52] U.S. Cl. ...................................... 355/40; 355/133
[58] Field of Search ...................... 355/40, 41, 42, 43, 355/133; 235/380, 381, 382

[56] References Cited

U.S. PATENT DOCUMENTS

| 3,093,994 | 6/1963 | Richard | 235/382 |
| 3,697,729 | 10/1972 | Edwards et al. | 235/381 |
| 3,818,190 | 6/1974 | Silverman et al. | 235/382 |
| 3,829,661 | 8/1974 | Silverman et al. | 355/41 |
| 3,866,173 | 2/1975 | Moorman et al. | 235/382 |
| 3,987,467 | 10/1976 | Cowles | 355/40 |
| 4,012,122 | 3/1977 | McVeigh | 355/40 |
| 4,025,759 | 5/1977 | Scheffel | 235/380 |
| 4,029,414 | 6/1977 | Rubenstein | 355/40 |
| 4,094,462 | 6/1978 | Moschner | 235/380 |
| 4,179,064 | 12/1979 | Yoshioka et al. | 235/381 |
| 4,192,606 | 3/1980 | Lewis | 355/40 |
| 4,204,113 | 5/1980 | Giraud et al. | 235/380 |
| 4,213,038 | 7/1980 | Silverman et al. | 235/381 |
| 4,271,482 | 6/1981 | Giraud | 235/380 |

OTHER PUBLICATIONS

IBM Technical Disclosure Bulletin, vol. 15, No. 7, 12-1972, J. C. Murinace, p. 2328.
IBM Technical Disclosure Bulletin, vol. 18, No. 6, 11-1975, J. L. Bacon, pp. 1747-1748.

Primary Examiner—Monroe H. Hayes
Attorney, Agent, or Firm—Donald Brown

[57] ABSTRACT

For registering the use of copying machines, the copying operation is initially enabled by introduction of user representative data. To provide evidence with respect to the identity of a person who made one or more copies of an original a separate record of the original is generated, and an information identifying the user is included on the record. The original may only be withdrawn from the copying machine after this record has been generated.

7 Claims, 6 Drawing Figures

METHOD AND DEVICE FOR REGISTERING THE USE OF COPYING MACHINES

This application is a continuation, of application Ser. No. 553,421, filed Nov. 18, 1983 now abandoned which is a continuation of Ser. No. 302,096, filed Sept. 14, 1981 now abandoned.

BACKGROUND OF THE INVENTION:

This invention generally relates to a method of and a device for registering the use of copying machines, more particularly of those copying machines in which an original is put on a suitable support and in which data representative of the user are introduced for enabling the copying operation. The invention further relates to a copying machine for performing the method.

In certain cases of use it is desired to permit evidence to be provided with respect to the originals which have been copied with a copying machine.

OBJECTS OF THE INVENTION

It is a primary object of the invention to provide a method of copying originals allowing only authorized persons to perform the copying operation.

A further object of the invention is to provide a method allowing only authorized persons to produce multiple reproductions of an original, and providing evidence with respect to the person who made the reproductions.

A further object of the invention is to provide a method of the above mentioned kind in which the evidence with respect to the person who made the reproductions is not affected by any malfunction of the copying machine.

A still further object of the invention is to provide a device for performing the above mentioned method.

SUMMARY OF THE INVENTION

In accordance with the invention, in additon to the copy made from an original, the original is registered together with an information representative of the user of the copying machine. The separate registration of the original which has been copied may be an additional copy of the original on which data are imprinted to identify the user of the copying machine. The registration or the additional copies bearing the user representative data are preferably deposited at a location protected from unauthorized manipulation, for example in an armoured safe container.

A copying machine for performing the method is provided with a recording arrangement for recording or registering the original from which copies are being produced together with data representative of the user of the copying machine. The recording arrangement may be a printer imprinting the user representative data on an additional copy made from the original.

BRIEF DESCRIPTION OF THE DRAWINGS

Further features, objects and advantages of the invention will stand out from the following description of non-limitative exemplary embodiments of the invention with reference to the drawings. In the drawings.

Figure 1:
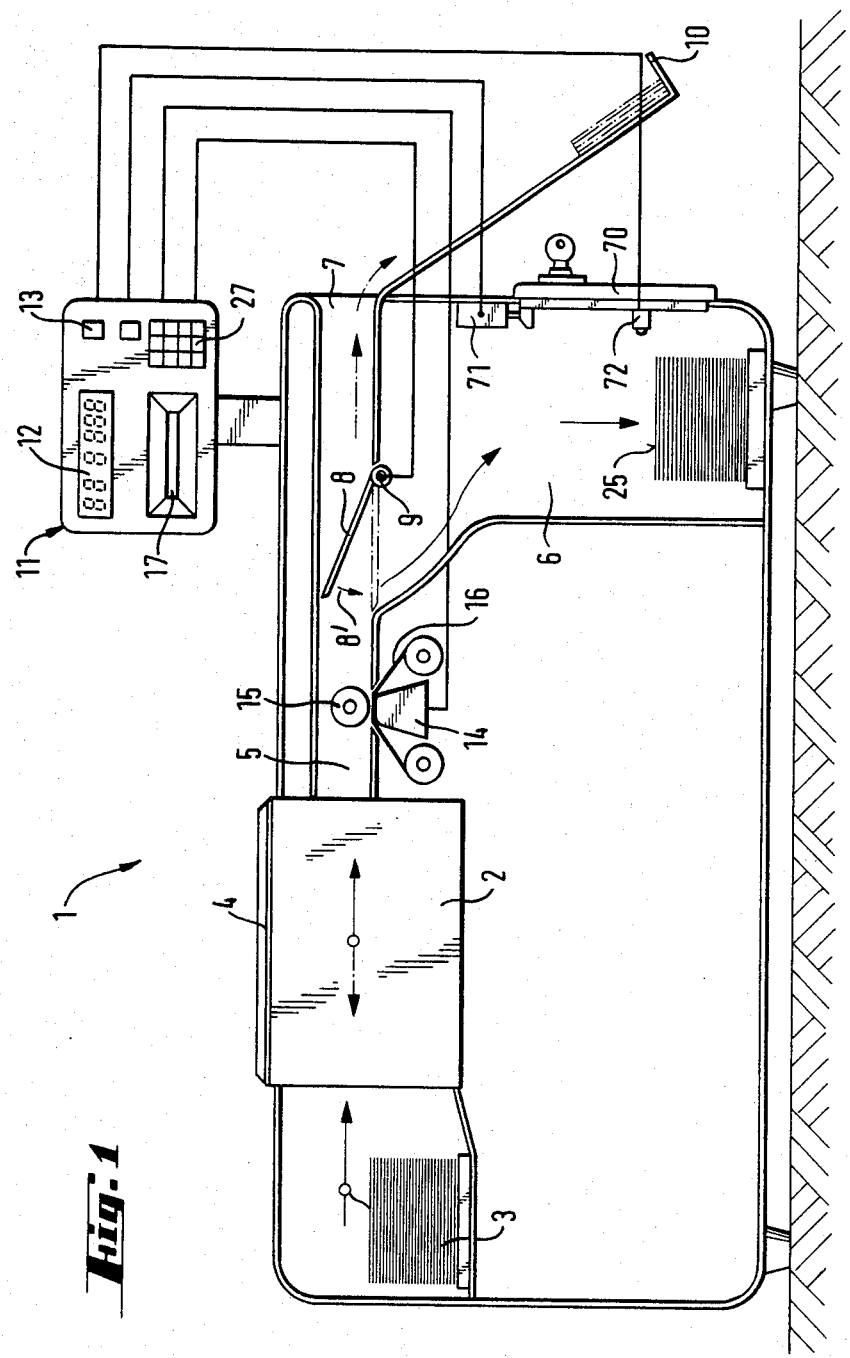
FIG. 1 is a lateral view of a copying apparatus, one side wall being omitted.

In the copying apparatus 1 shown in FIG. 1, the front wall facing the user is omitted for clarity. In conventional manner, the copying apparatus comprises a copying station 2 of conventional type, a paper supply station 3 for providing paper to the copying station and a support 4 for the originals to be reproduced with the copying apparatus. The output side of the copying station 2 is followed by a conveying channel 5 which may be selectively connected with a container formed as a safe compartment 6 or a copy delivery opening 7. The respective connections are made by a flap 8 mounted on an axis 9 to be pivotable thereabout. The axis 9 may be reciprocated by a drive not shown between the position shown in FIG. 1 in which the conveying channel 5 is connected with the safe compartment 6 and a second position (shown with dash-dotted lines) in which the flap 8 is pivoted downwardly in the direction of an arrow 81 so that the conveying channel is connected with the copy delivery opening 7. The copy delivery opening 7 is followed by a collecting container 10 for receiving completed copies. The copying apparatus is provided with a control panel 11 having a display 12 and a button 13 for starting the copying operation. The actual control of the data processing portion is integrated into the control panel 11.

The safe compartment 6 is accessable to authorized persons through a door 70 which may be locked. A sensor 71 is provided for sensing whether the door 70 is closed. The output of sensor 71 is connected with a controller 21 of the copying station. Further, a second sensor 72 is provided in the safe compartment 6 in a manner to detect a copy being supplied and to be stored. Its output is also connected with the controller 21.

Figure 2:
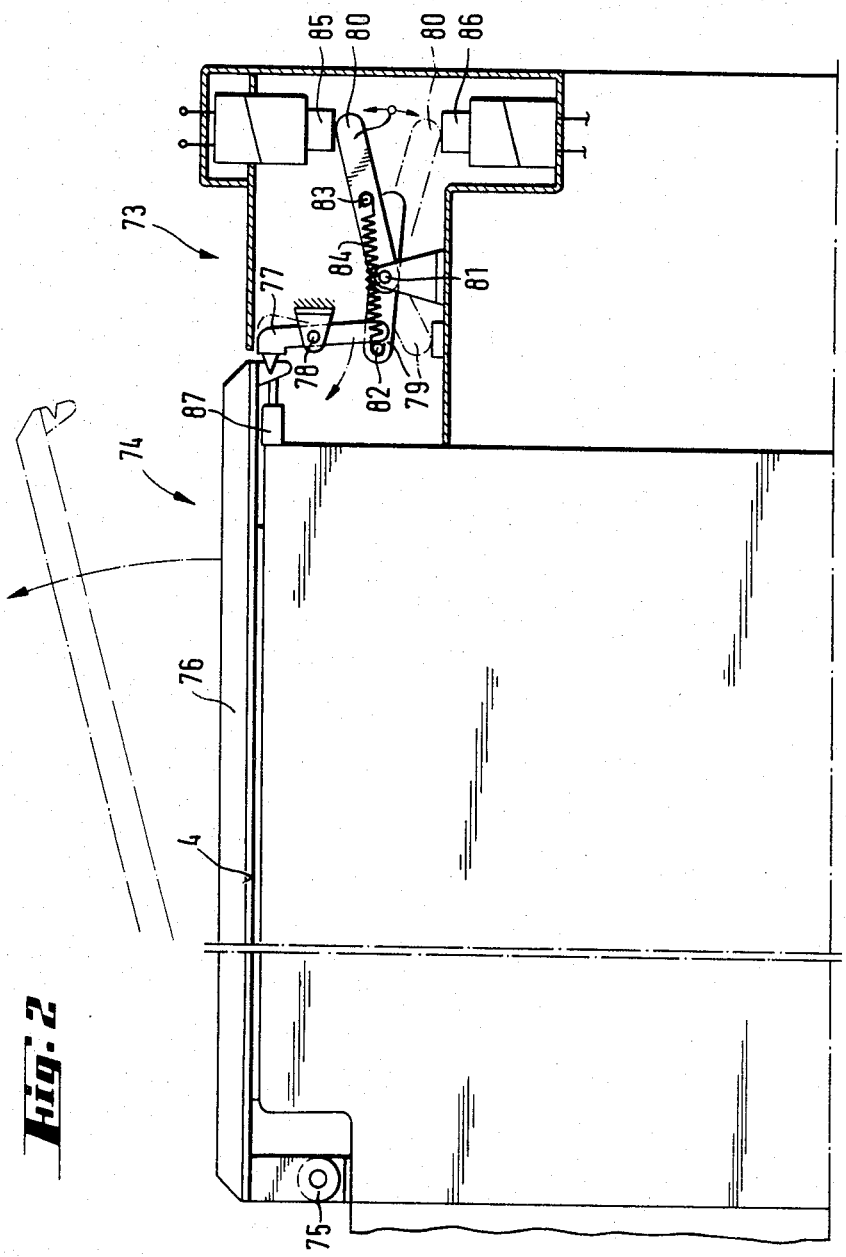
FIG. 2 is a section of a locking device.
Figure 3:
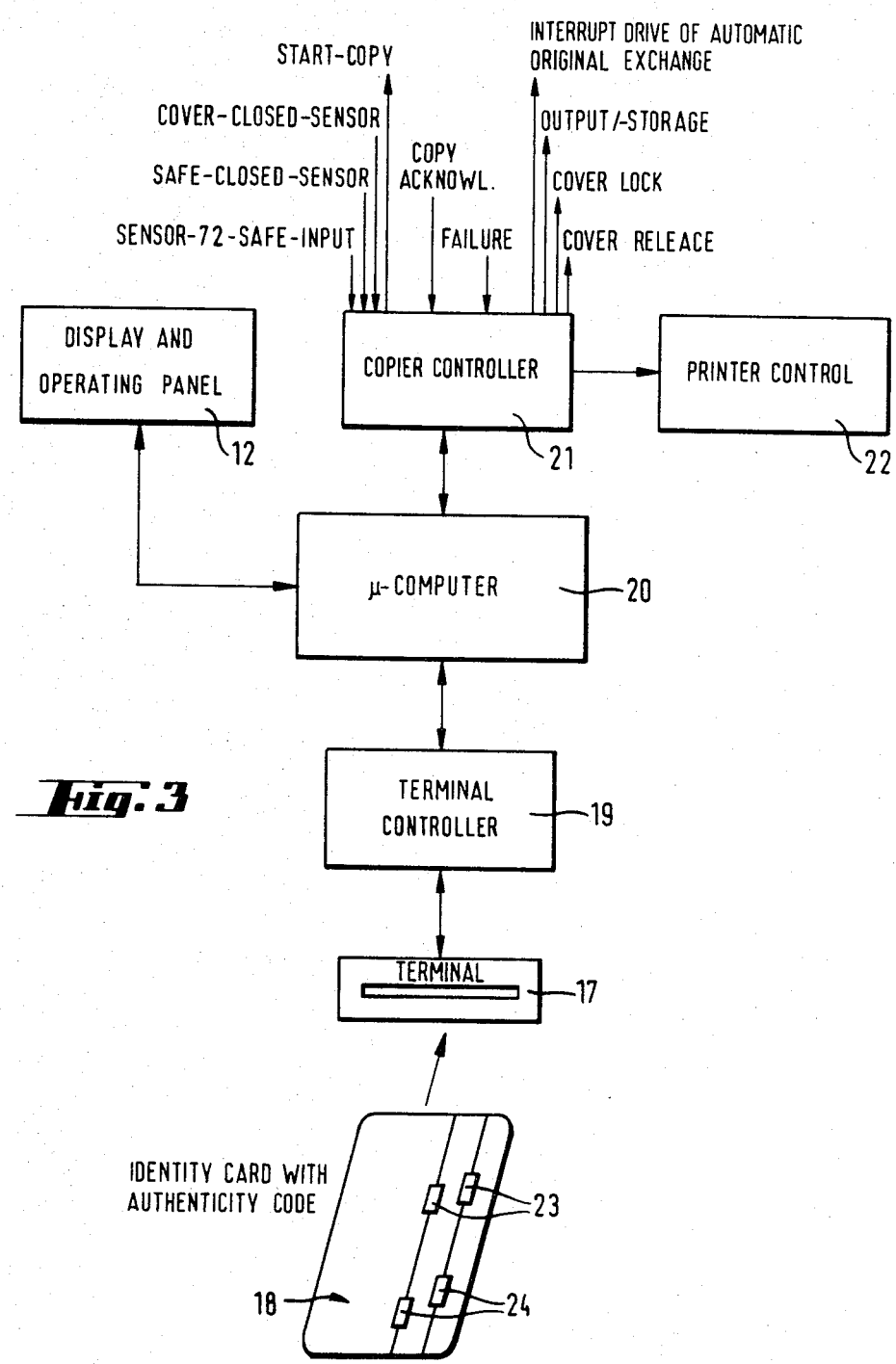
FIG. 3 is a diagrammatic view of the interconnected data processing and control elements.

As shown in FIG. 2, the cover arrangement 74 is provided for covering the support 4. It comprises a cover 76 pivotable about a hinge 75 connected with the machine frame. Further, a locking device 73 is provided engaging with its locking member 77 into a corresponding recess of the cover 76 to hold the same in its closed position when in the locked state. The locking arrangement 73 comprises the locking member 77 which is free to pivot about a bearing 78 and two levers 79, 80 pivotably supported on a shaft 81 connected to the machine frame. The two levers are respectively provided with holding members 82, 83 spaced from the shaft 81 and engaged by a traction spring 84 in such a manner that the two levers 82, 83 are adjustable in first and second stable positions. A solenoid having two poles 85, 86 engages on the end of the lever 80 to pull or push the lever 80 into the first stable position shown in FIG. 2 in which the lever rests on the pole 85, or into the second stable position in which the lever 80 rests on the pole 86 (shown in dash-dotted lines), in accordance with exitation. In the shown first stable position, the lever 79 holds the locking member 77 in the locked position of cover 76 through the holding member 82 used as an abutment. In the opposed second stable position, the locking member is released so that the cover may be moved freely. The coils of the solenoid are connected at their inputs to the controller 21 and are controlled thereby. Further, a sensor 87 is arranged to determine whether cover 77 is open or completely closed. Its output signal is supplied to the controller 21 through a line not shown.

At the output of the copying station 2 and upstream from the branching of the conveying channel towards the copying delivery output or the safe compartment, a device is provided formed by a printing head 14 and a co-operating printing roller 15 together with an ink tape 16 for the printing head. The printing head and the printing roller are arranged in such a manner that the copies exiting from the copying station 2 are preferably all directed between the printing roller and the printing head. A terminal 17 for receiving and processing an authorization card 18 is integrated into the control panel 11. The terminal comprises a controller 19 connected with a micro-computer 20. The micro-computer 20 is connected with the display 12 on the one hand and with the controller 21 of the copying station 2 on the other hand. Finally, the controller 21 is connected with a printing control 22 of the printing device 14, 15, 16.

The authorization card 18 is formed in a manner to contain the data for the authenticity track, i.e. for providing evidence that the card is among the allowed cards, as well as for identification, i.e. for providing evidence with respect to whom the card was delivered, to be read out by the terminal, particularly in coded form and on a magnetic track. Further, the authorization card 18 comprises adjustment members 23, 24 by which the authorized user may adjust a code word only known to himself in the form of a memorized number and/or memorized word. The adjustment of the adjustment members 23, 24 made by the user may be detected by the terminal 17. The data characterizing all of the personal code words of the individual authorized persons may be stored within the computer 20. However, it is also possible to mark the authenticity data resulting from the adjustment of the adjustment members 23, 24 on the authorization card itself in a manner to be read by the terminal, so that the terminal and the computer will compare the data eventually marked in coded form on the authorization card with the actual adjustment of the adjustment members, through the personal code word. Only in case of coincidence it will be assumed that the user is actually the authorized person. The terminal is formed in such a manner, that upon restitution of the card, the adjustment members 23, 24 are moved back to a zeroposition towards one of the abutment sides so that the authorization card will not be accessible to any third person in a form having the personal adjustment of the adjustment members.

In operation, the user will initially introduce the authorization care 18 into the terminal 17. Through the controller 19 the micro-computer 20 will check the card with respect to the above disclosed features, i.e. with respect to authenticity and permission, particularly whether the user is an authorized person. Upon a positive result the display 12 will signal that the copying station is ready for the copying operation. In the contrary case, the card is refused. Further, the control may be formed in a manner to withdraw the card in the contrary case into a closed portion or to erase the marked information. The operator will now put the original to be copied on the support 4 and push the button 13 to start the copying operation. Subsequently, a copy will be made. The printer control 22 will operate the printing arrangement 14, 15, 16 in a manner to mark the personal data of the user resulting from the authorization card, eventually together with time and date of the copying operation, on the copy. Subsequently, the copy 25 will be supplied to the safe compartment 6 to be stored therein, when the flap 8 is in the position shown in FIG. 1. Through a signal line shown in FIG. 1, the drive of the flap 8 will be operated to change its position so that the access to the safe compartment 6 will be closed and access to the copy delivery opening 7 will be open. Now, a second copy of the original will be made and directed to a copy delivery opening 7 towards the collector container 10 to be removed therefrom without the copy being imprinted. If desired the delivered copies may also be imprinted in corresponding manner.

By this will be achieved that, on the one hand, only an authorized person may use the copying apparatus, because only the authorized person will know the personal code word and may enable the use of the copying apparatus. On the other hand, it will be ensured that not only duplicates of the copies of originals are provided in the safe compartment, but in addition, the person who made the copy may be determined. As any third person would not know the personal code of the authorized persons, any third person would be prevented from using an authorization card to enable a copying operation, and more particularly, it will be prevented that an authorized person will be marked on a copy as the user if he is not the actual user.

The sensor 72 will check whether a copy 25 has arrived in the safe compartment 6. Only then the output signal of the sensor 72 provided to the controller 21 will enable the start copy signal for the successive copies, and at the end of the completed copying operation, the locking arrangement 73 is released. In case a copy 25 is not received in the safe compartment 6, e.g. as a consequence of a paper jam or manipulation of third persons in the copying apparatus, the locking device 73 is maintained in the locking state until a new copy of the original on the support is made and received in the safe compartment 6. Simultaneously, the user representative data introduced with the authorization card are stored in the micro-computer 20 in a manner that they may be read therefrom, but not erased by unauthorized persons. In this case too, it may be determined who made a copy of the original. In accordance with another embodiment, the drive of the terminal 17 is controlled by the controller 21 in a manner to release the authorization card only when the controller 21 receives the signal of the sensor 72 that the copy 25 was received in the safe compartment. In the contrary case, the authorization card would not be restituted. In this way, even in case of paper jams or other malfunctions of the copying apparatus any user may repair the malfunction, without preventing that safe evidence with respect to the user would be lost thereby. Thus, it is not necessary that only an authorized person will be allowed to remove a simple paper jam, for example.

In the above disclosed embodiment, the original is held within the copying apparatus by locking the cover until a copy thereof is stored in the safe compartment. With copying machines having automatic original feed and/or automatic ejection, the output signal used in the above example for controlling the locking device 73 is supplied to the ejection device to control the same in a manner to operate the automatic original changing device and to proceed with the ejection of an original only when a copy thereof is received in the safe compartment.

Figure 4:
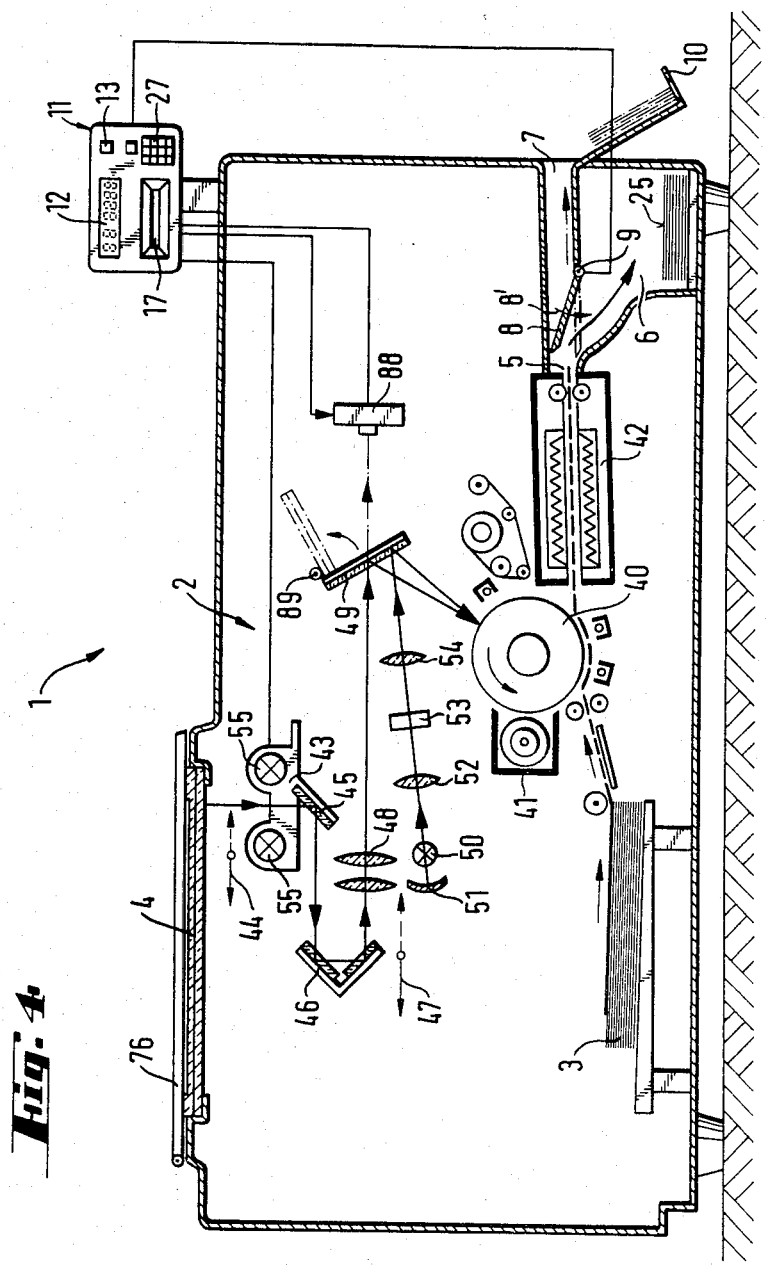
FIG. 4 shows a modification of the FIG. 1 embodiment.
Figure 5:
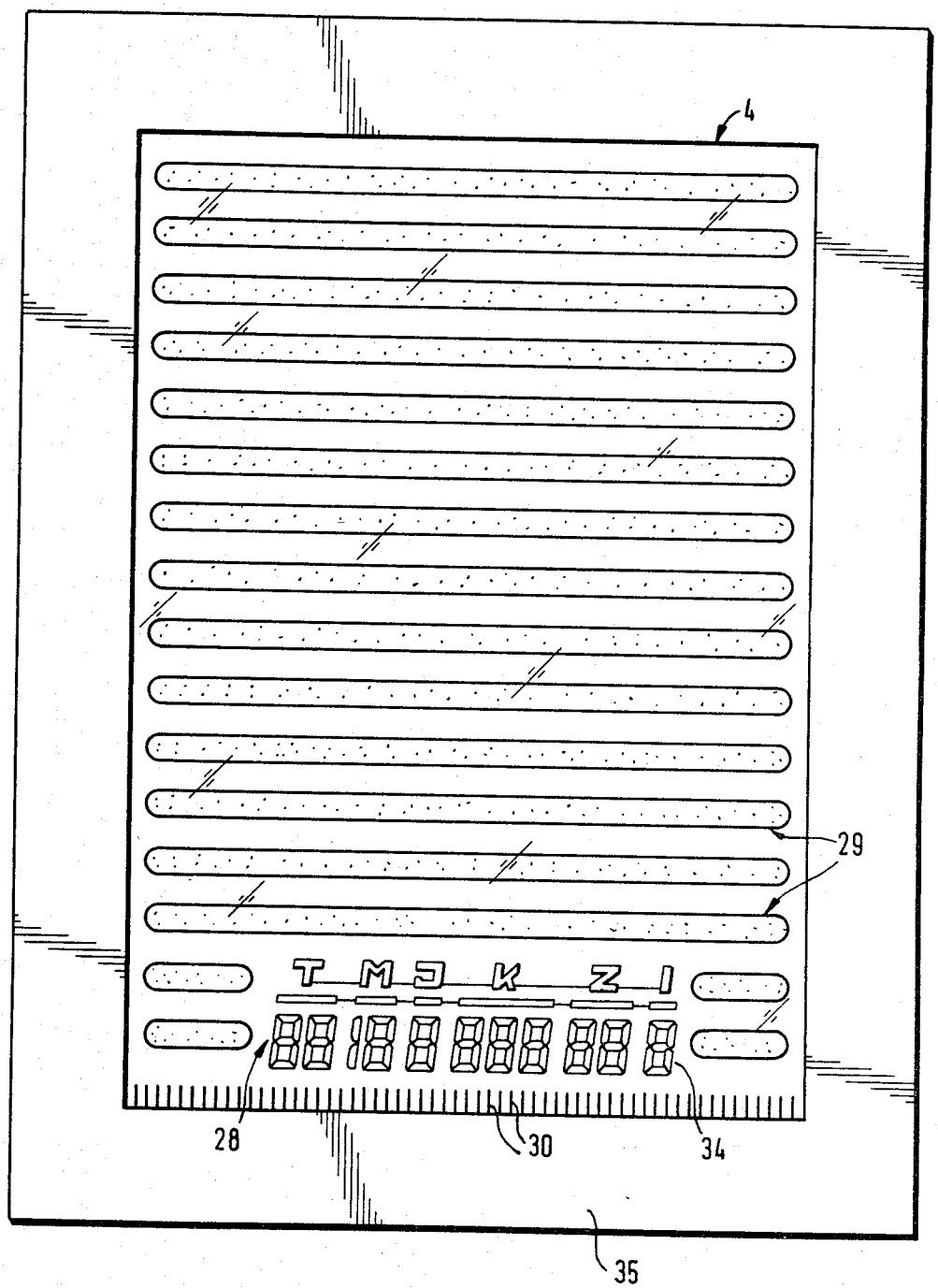
FIG. 5 is a plan view of a support of the apparatus shown in FIG. 4.
Figure 6:
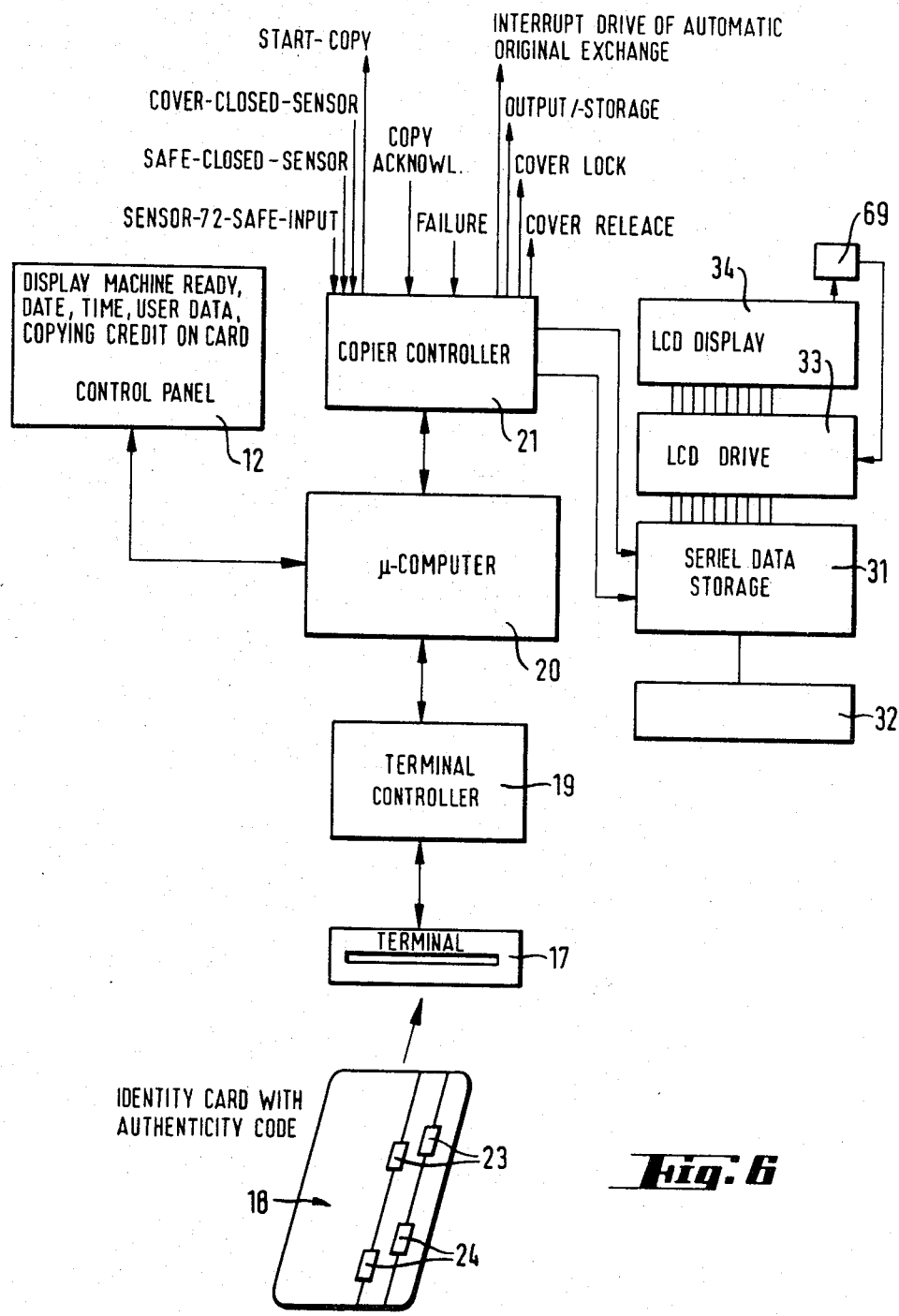
FIG. 6 is a diagrammatic view of the interconnected data processing and control elements of the FIG. 4 embodiment.

In the embodiment shown in FIG. 4, the support 4 of the copying station 2 has the form of a composite glass plate held in a frame 35 (cf. FIG. 5). The composite glass plate comprises a layer of liquid cristals. A first zone 28 of these liquid cristals forms a LCD-display 34, for example indicating day, month, year, customer number, time, institution or any other user information. The remaining zone of the support 4 is possibly completely covered by a second zone 29 of liquid cristal segments. At one end of the support, connections 30 arranged outside the light path are provided with lines leading towards an LCD-driver 33 and a voltage supply 32 for connecting the two zones 28, 29. In this embodiment, the user representative data are recorded by fading-in into the light path of the copying apparatus rather than by a printer. The control of this embodiment is shown in FIG. 6. It differs from that of the above mentioned embodiment by having, in state of the printer control 22, a serial data storage 31, the voltage supply 32, the LCD-drive 33 and the LCD-display 34. The serial data storage 31 is connected to the controller 21 through a data line and a clock line. Its operating voltage is supplied by the voltage supply 32 of the copying apparatus. On its output side, it is connected to the LCD-drive 33 in turn connected with the LCD-display 34 of the zones 28, 29.

The operation of this embodiment is the following: Initially, an authenticity check of the card 18 is made. Then it is introduced into the terminal 17. Upon positive checking result, the copying apparatus 1 is switched ready for operation by the controller 21. The operator now puts the original to be copied on the support 4 and triggers the copying operation by the button 13. Then, a copy will be made. As long as no data are transmitted from the controller 21 to the serial data storage, the second zone 29 of the liquid cristal is reflective or dark, so that the original eventually laid thereon cannot be reproduced because the supporting surface is reflective, so that the light path is substantially interrupted. By triggering the copying operation through the button 13 and the subsequent control of the serial data storage 31 through the controller 21, a corresponding signal is delivered to the LCD-drive 33 and thus to the LCD-display 34. As a result, the second zone 29 of the liquid cristal will be switched into a transparent state. Simultaneously, the first zone 28 of the LCD-display 34 will display the personal data of the user resulting from the authorization card, and particularly the code word, eventually together with the time and date of making the copy, and thus directed into the light path of the copying apparatus so that they will automatically be recorded on the copy during the copying operation. Subsequently, the copy 25 will be directed into the safe compartment 6 to be stored therein, when the flap 8 is in the position shown in FIG. 1. Through the signalling line indicated in FIG. 1 the drive of the flap 8 will be operated to change the same so that the access to the safe compartment 6 will be closed and the access to the copy delivery opening 7 will be open. A second copy of the original will be made and directed through the copy delivery opening 7 outwardly to the collecting container 10 to be removed therefrom without having marked the copy. If desired, in this case too, each copy may be marked to indicate the person who made the copy.

The controller 21 and the serial data storage 31 will simultaneously perform a counting operation of the successive number of the copies made on the copying apparatus. The LCD-display of the first zone 28 will preferably indicate this number. In this manner, each copy is associated with a number marked on the copy to be stored by the fading-in together with the information identifying the user.

This will allow to check the completeness of the copies stored in the safe compartment. Simultaneously, the counter printer will deliver a signal through the LCD-drive and the controller 21 to the controller 19 causing the number of the stored copies to be marked on the authorization card 18 within the terminal 17. This number may be marked on the magnetic strip of the authorization card or in the form of an imprinted number. In that case, the authorization card is preferably formed as a value card, i.e. the magnetic strip contains, in addition to the data characterizing the user and the card, data which indicate a maximum number of copies to be made by the authorized persons. The controller 19 is formed to rerecord, through the terminal 17, the previous copying volume minus the number of the copies made, after each copying operation.

In order to prevent the controller 21 from being bypassed to prevent evidence with respect to the performed copying operations, the voltage supply of a serial data storage 31 is taken from the voltage supply 32 of the copying apparatus, together with the LCD-drive 33 and the LCD-display.

Further, by-passing will be prevented by the fact that the second zone 29 covering as much as possible of the copying zone in the above disclosed manner will be reflective without control by the controller 21 to interrupt the light path. Preferably, a connection between the controller 21 and a device for keeping a cover 76 closed on the support 4 may be provided. The controller is formed to deliver signals for making a copy only in case the cover is maintained in a closed state. This will prevent originals to be changed during the copying operation.

As shown in FIG. 4 in detail, the copying apparatus comprises in conventional manner, upstream from the conveying channel 5, a drum 40 as an intermediate image carrier, a colouring station 41 and a fixing station 42. In addition, the imaging apparatus proper is provided. This comprises a lamp sledge 43 with lamps 55 reciprocating in the direction of an arrow 44. A deflection mirror 45 is secured on the lamp sledge to be movable therewith. Spaced from the lamp sledge is a pair of deflecting mirrors 46 which are movable parallel to the lamp sledge and simultaneously therewith in the direction of an arrow 47, the speed of the deflection mirror pair being half of the lamp sledge speed. An objective 48 is arranged in the light path behind the deflection mirror pair. The objective is stationary and connected with the machine frame in a manner not shown. From the objective 48 the light path passes through a further deflection mirror 49 to the drum 40. This imaging apparatus will generate an intermediate image of an original to be copied on the drum 40.

Continuing the light path from the objective 48 to the deflection mirror 49, an image recording arrangement 88 is aligned with the optical axis of the light path. The image recording arrangement 88 may be a camera having a photographic record medium or a camera having an electronic record medium, for example a semi-conductor light receiving matrix. The arrangement is such that the distance of the record medium from the original is the same as the distance of the original from the drum surface. The deflection mirror 49 is mounted at its upper end to a shaft 89 to be pivotable by a drive not shown into the first position shown in solid lines in FIG. 4 and into a second position shown in FIG. 4 with dash-dotted lines. With this embodiment, the original of which a copy is to be produced and the user representative data faded-in into the light beam may be directly recorded on a film or an electronic record medium by using the image recording arrangement 88. To this end, when the first image of the original is made, the drive of the mirror 49 and the camera 88 are controlled by the controller 21 in a manner to pivot the mirror to the dash-dotted position to project the image of the original on the plane of the record medium of the image recording arrangement 88. The original and the faded-in representative data are recorded thereon. As soon as the recording operation on the record medium of the image recording arrangement 88 is completed, it will provide a corresponding output signal to the controller 21. Prior to this, it will not be possible to image the original on the drum to make a copy thereof. Only when an output signal of the image recording arrangement confirms that a record was made, the controller will deliver a signal to the mirror 49 to move the mirror back into the position shown in FIG. 4 in solid lines. When the original is next exposed, an image thereof may be generated on the drum 40, and thus a copy may be made.

The controller is formed in such a manner that, depending on the predetermined adjustment and prior to making a copy to be delivered through the copy delivery opening 7, it will initially cause a recording operation on the record medium of the image recording arangement 88 as disclosed above, and upon the successive exposure of the original, a record copy will be made just as with the first embodiment to be stored in the safe compartment 6. Only upon the third exposure, the copy delivery opening will be enable by the flap 8. The image recording arrangement 88 may be provided in place of the safe compartment, so that a record is made only on the record medium of the image recording arrangement and no record copy to be stored in the safe compartment is made. In this case, upon the first exposure of the original, the record on the record medium of the image recording arrangement 88 is made, and upon the successive exposures, the copies to be delivered are made.

In place of or in addition to the device of FIG. 4 for introducing information into the light path using the composite glass plate having a liquid crystal layer, another type of imaging means may be used as additionally shown in FIG. 4. This comprises a flash lamp 50 with a parabolic mirror 51. The flash lamp 50 is followed by a collimator 52 converting the light from the flash lamp 50 into a parallel light beam. The collimator is followed by an LCD-display 53 arranged in the light path. This is followed in the light path by an objective 54. Subsequently, the light path is deflected by the deflecting mirror 49 to the drum 40. The objective 55 images the LCD-display 53 through the deflecting mirror 49 onto the drum. The members 50 through 54 are stationary with respect to the machine frame just as the deflecting mirror 49, using fixtures not shown. Both of the light paths from the members 43–48 imaging the original and the members 50–54 imaging the LCD-display 53 are shifted one against the other in a manner not to interfere with each other. The lamps 55 of the lamp sledge 43 and the flash lamp 50 are connected with the controller 21 of the copying apparatus to be controlled thereby. For the remainder, the control of the above disclosed embodiment corresponds to that shown in FIG. 6.

The control is made in such a manner that the lamps 55 remain lighted during a predetermined period $t_2$ to perform the copying operation after it has been triggered. At the end of the period $t_2$, the lamps 55 are switched off during a period $t_1$, the lamp sledge 43 being moved on at the same speed. Simultaneously, the flash lamp 50 is switched on to image the content of the LCD-display 53 into this darkened section of the copy to be made, initially on the intermediate image carrier, thus on the drum 40. After the period $t_1$ the flash lamp 50 is again switched off, and lamp 55 is again switched on, and the copying operation is continued to image the remaining part of the original on the drum. In this manner the data characterizing the user are automatically marked on the completed copy. Subsequently, the copy 25 is directed into the safe compartment 6 to be stored therein when the flap 8 is in the position shown in FIG. 1. For the remainder, the copying operation corresponds with that above disclosed. As shown in FIG. 6, a feedback sensor 69 or photo transistor may be provided which is exposed to the light from the flash bulb 50 to indicate its operation. Should the output signal of the feedback sensor 69 indicate failure of the flash bulb 50, the subsequent copying operation is not enabled, so that no copy will leave the apparatus through the copy delivery output 7. The subsequent copying operation will only be enabled after a flash was detected.

To improve the security, the control of the above disclosed device is embodied in a manner to mark a checking information indicating the operativeness of the means for generating the characteristic user information, such as the LCD-display 34 or the LCD-display 53, on the intermediate image carrier 40 or on the record, particularly on the copy, in addition to the information characterizing the user. To this end, the LCD-display 53 displays an indication complementary to the preceding line of the personal data to be recorded, in a line to be additionally recorded.

It should be understood that the above description is in no way limitative and that many modifications may be brought to the embodiments disclosed without departing from the true spirit of the invention.

What is claimed is:

1. A copier system comprising:
   (a) means for detecting user identity information,
   (b) means for converting said detected user identity information into a form for recording such information on a record of a document,
   (c) means for receiving a document to be copied, said means including a support and a cover,
   (d) means for locking said cover to hold the document to be copied until such time as the cover is unlocked,
   (e) means for recording said document with said user identity information on said record,
   (f) means for storing said record of said document containing said user identity information in said copier system, and
   (g) means for unlocking said means for locking to release the cover after determining that a record of said document containing said user identity information has been stored in said copier system.
2. A copier system comprising:
   (a) safe compartment for the holding of a copy of an original containing user identity information,
   (b) a copy delivering opening for the providing of copies of originals without said user identity information, (c) means for detecting user identity information,
(d) means responsive to said detected user identity information for making a copy of said original with user identification information on said copy of said original,
(e) means for storing said copy of said original containing user identity information in said safe compartment,
(f) means for preventing return to the user after placement into the copier system of said original until a copy of said original has been stored in said safe compartment, and
(g) means for permitting copies of said original without user identity information to be provided to said copy delivering opening.

3. The system of claim 2 in which said means for making a copy of the original with user identity information comprises printing means for marking a copy of the original with user identity information.

4. The system of claim 2 in which means is provided for preventing supply of copies of said original without user information to said copy delivery opening until a copy of said original with user identity information is detected as being received in said safe compartment.

5. The system of claim 2 in which information generating means provides user identity information which is copied at the same time a copy of the original document is made so that the copy stored in the safe compartment includes user identity information.

6. The system of claim 5 in which said information generating means comprises a liquid crystal display.

7. A copier comprising
(a) first means for receiving an original for copying,
(b) a safe compartment for receiving a copy of said original,
(c) means for locking said original in said receiving means until a copy of said original has been detected as being stored in said safe compartment, and
(d) means for detecting storage of said copy of said original in said safe compartment and then releasing said means for locking said original in said receiving means.

* * * * *